US012755578B2

(12) United States Patent
Yoshikawa

(10) Patent No.: US 12,755,578 B2
(45) Date of Patent: Oct. 6, 2026

(54) INFORMATION PROCESSING DEVICE, COMMUNICATION SUPPORT DEVICE, AND COMMUNICATION SUPPORT SYSTEM

(71) Applicant: SONY GROUP CORPORATION, Tokyo (JP)

(72) Inventor: Kiyoshi Yoshikawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 231 days.

(21) Appl. No.: 18/703,768

(22) PCT Filed: Sep. 7, 2022

(86) PCT No.: PCT/JP2022/033499
§ 371 (c)(1),
(2) Date: Apr. 23, 2024

(87) PCT Pub. No.: WO2023/074129
PCT Pub. Date: May 4, 2023

(65) Prior Publication Data
US 2024/0412560 A1 Dec. 12, 2024

(30) Foreign Application Priority Data
Nov. 1, 2021 (JP) ................................ 2021-178913

(51) Int. Cl.
*G06V 40/20* (2022.01)

(52) U.S. Cl.
CPC .................................. *G06V 40/20* (2022.01)

(58) Field of Classification Search
CPC ......... G06V 40/20; A61B 5/165; G06F 3/011; G06F 3/015; G06F 2203/011; G06F 3/01; G10L 25/63
See application file for complete search history.

(56) References Cited

U.S. PATENT DOCUMENTS

2018/0032126 A1* 2/2018 Liu ......................... G06F 3/011
2018/0077095 A1* 3/2018 Deyle .................. G06T 13/205
(Continued)

FOREIGN PATENT DOCUMENTS

JP 2012059107 A * 3/2012
JP 2018-068618 A 5/2018
(Continued)

OTHER PUBLICATIONS

Imani Maryam et al: "A survey of emotion recognition methods with emphasis on E-Learning environments", Journal of Network and Computer Applications, Academic Press, Aug. 27, 2019, pp. 1-33, vol. 147, pp. New York NY, XP085900185.
(Continued)

*Primary Examiner* — Shefali D Goradia
(74) *Attorney, Agent, or Firm* — CHIP LAW GROUP

(57) ABSTRACT

Provided is an information processing device that includes a first emotion estimation section that generates first emotion data by estimating emotion of a user based on a result of detection made by a first sensing section that detects a behavior of the user, the behavior being used for communication, and a second emotion estimation section that generates second emotion data by estimating emotion of the user based on a result of detection made by a second sensing section that detects a movement or response of the user, the movement or response not being used for communication. The information processing device further includes an emotion data generation section that determines ratios for the first emotion data and the second emotion data, and generates third emotion data by combining the first emotion data and the second emotion data based on ratios, and a communication section that transmits the third emotion data.

11 Claims, 6 Drawing Sheets

(56) References Cited

U.S. PATENT DOCUMENTS

| | | | | |
|---|---|---|---|---|
| 2019/0114934 | A1* | 4/2019 | Asa | G09B 5/00 |
| 2019/0251990 | A1* | 8/2019 | Nakagawa | G06F 3/167 |

FOREIGN PATENT DOCUMENTS

| | | | |
|---|---|---|---|
| JP | 2019-072371 | A | 5/2019 |
| JP | 2020-113197 | A | 7/2020 |
| JP | 2021-157609 | A | 10/2021 |

OTHER PUBLICATIONS

Masui Kenta et al: "Continuous estimation of emotional change using multimodal affective responses", 2020 IEEE/Cvf Conference on Computer Vision and Pattern Recognition Workshops (CVPRW), IEEE, Jun. 14, 2020 (Jun. 14, 2020), pp. 1172-1180, XP033799298.

International Search Report and Written Opinion of PCT Application No. PCT/JP2022/033499, issued on Nov. 22, 2022, 09 pages of ISRWO.

* cited by examiner

[FIG. 1]
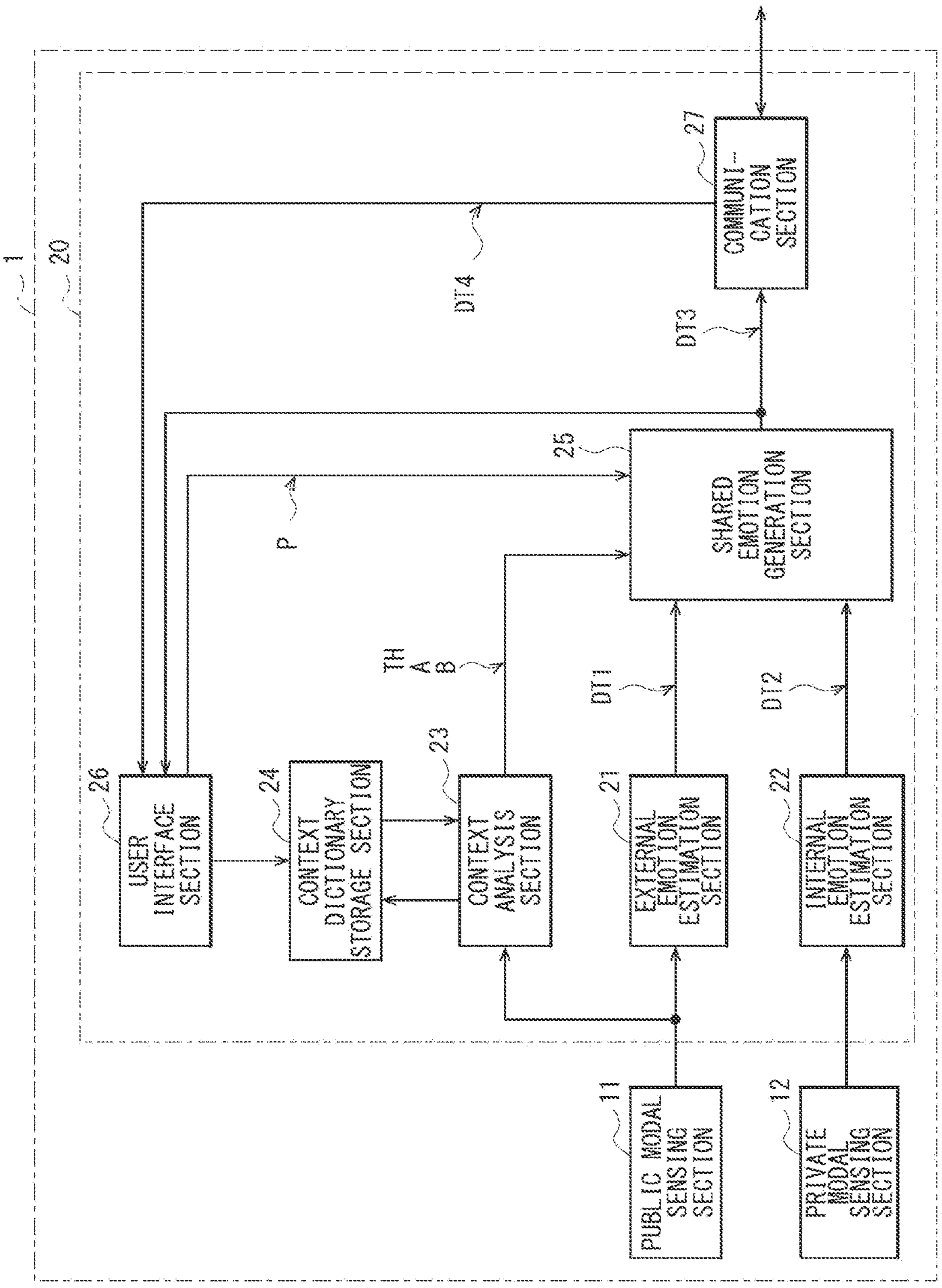

[FIG. 2]
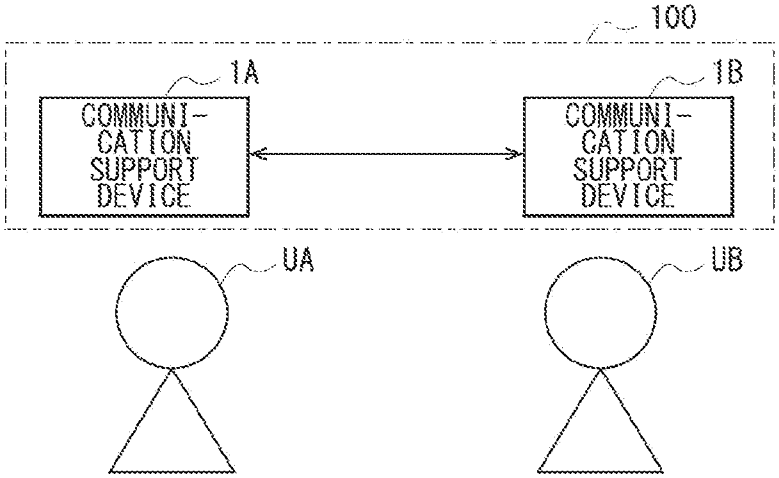
[FIG. 3]
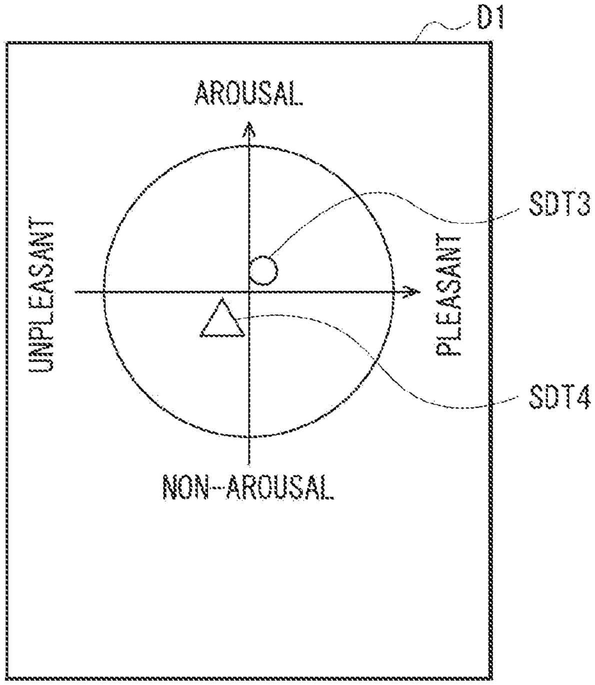

[FIG. 4]
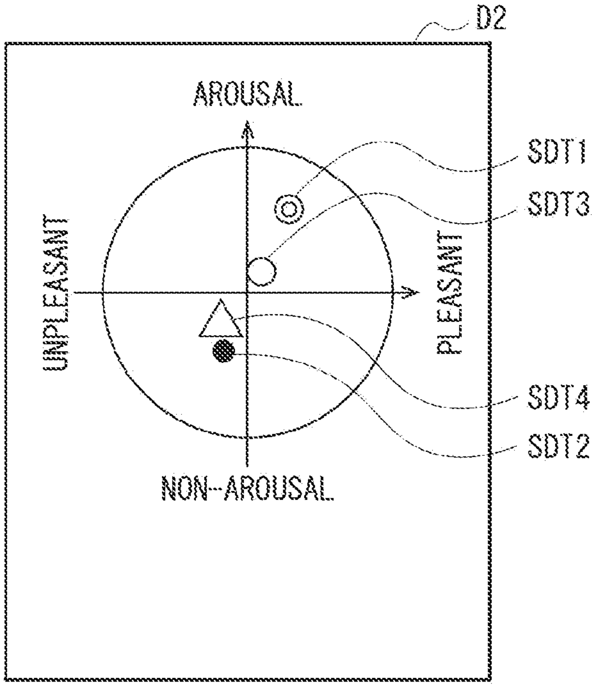
[FIG. 5]
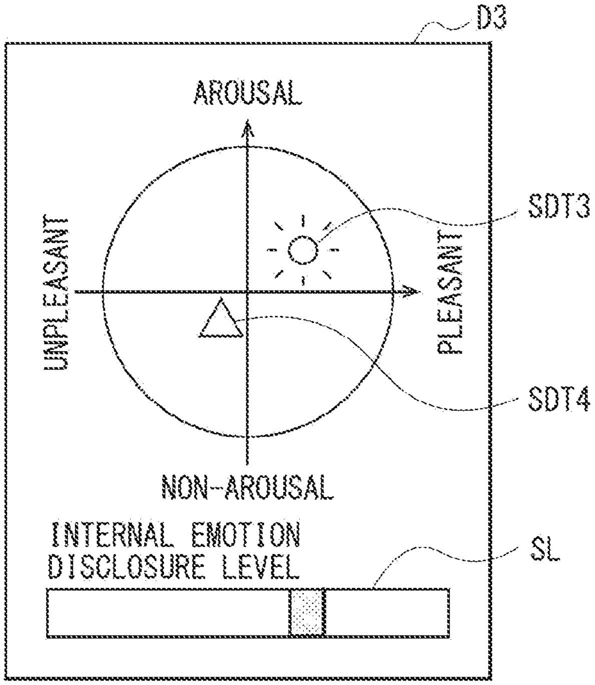

[FIG. 6]
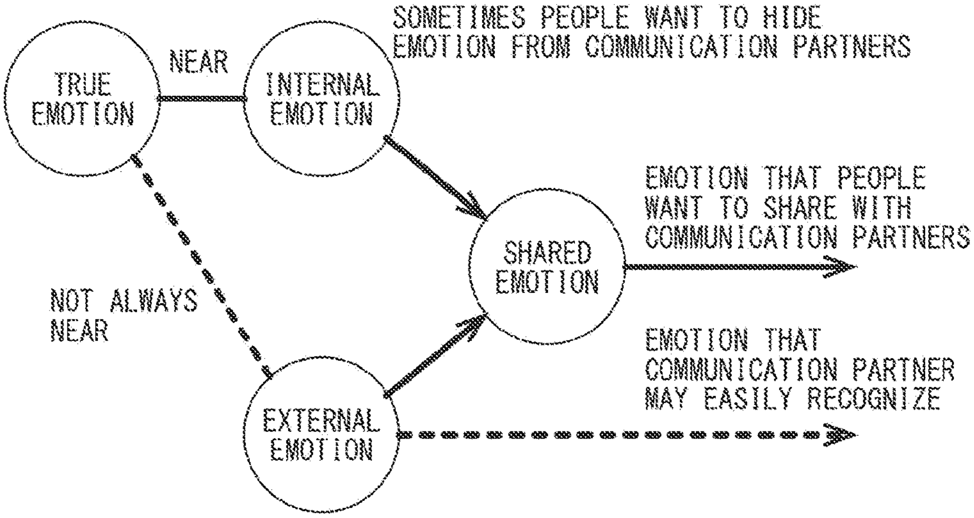

[FIG. 7]
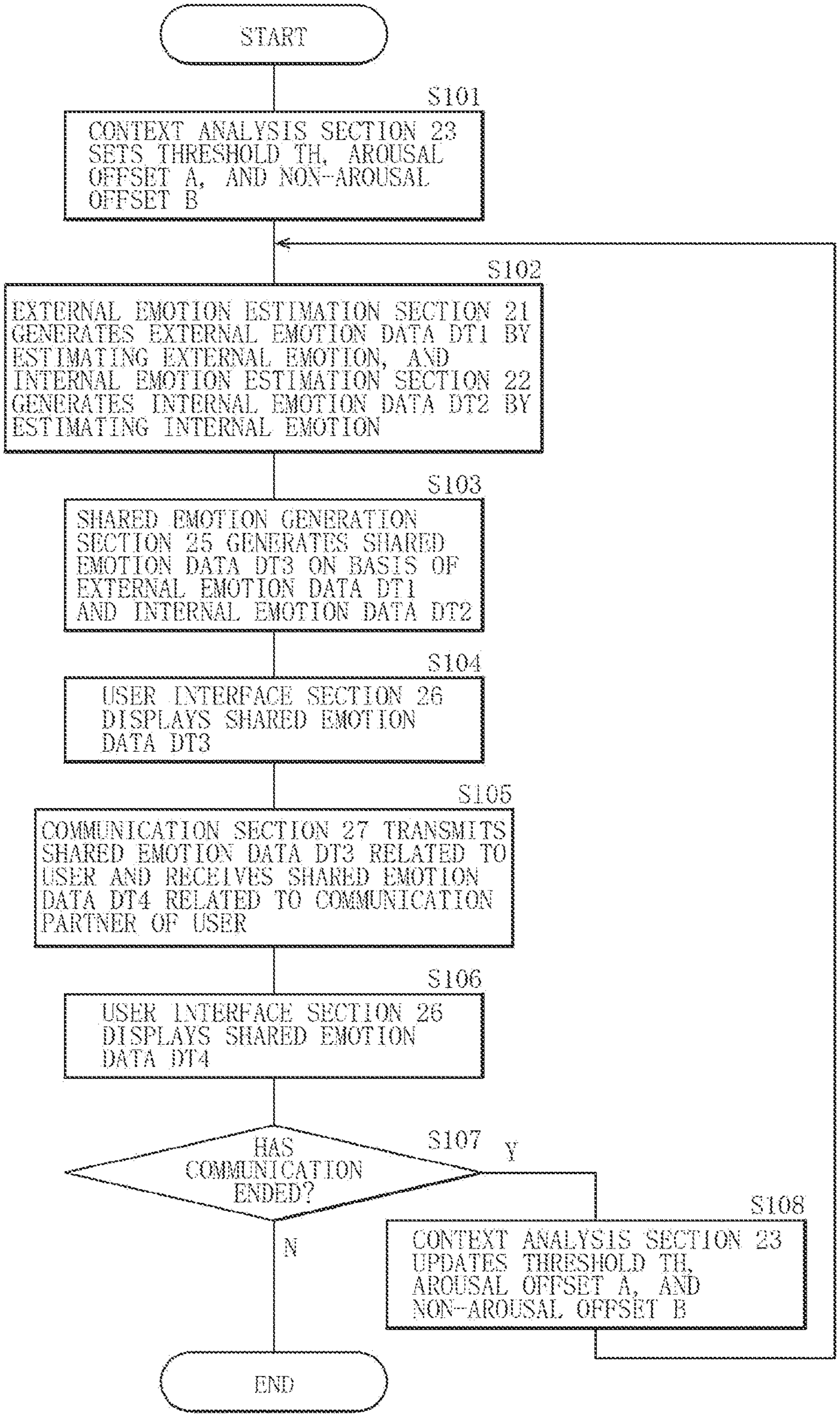

[FIG. 8]
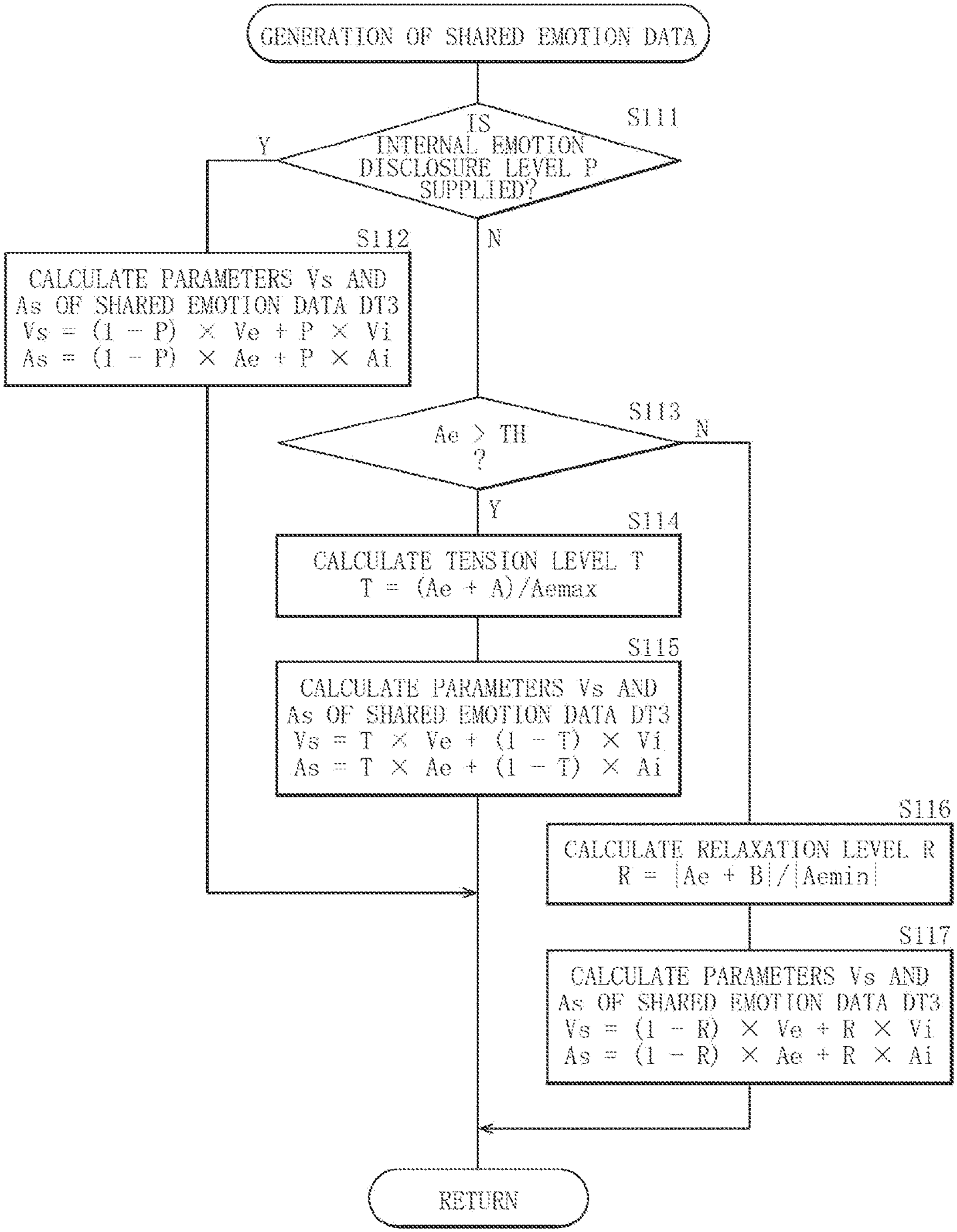

INFORMATION PROCESSING DEVICE, COMMUNICATION SUPPORT DEVICE, AND COMMUNICATION SUPPORT SYSTEM

CROSS REFERENCE TO RELATED APPLICATIONS

This application is a U.S. National Phase of International Patent Application No. PCT/JP2022/033499 filed on Sep. 7, 2022, which claims priority benefit of Japanese Patent Application No. JP 2021-178913 filed in the Japan Patent Office on Nov. 1, 2021. Each of the above-referenced applications is hereby incorporated herein by reference in its entirety.

TECHNICAL FIELD

The present disclosure relates to an information processing device, communication support device, and communication support system that support communication among users by conveying emotions of the users to partners.

BACKGROUND ART

In some cases, it is possible to improve communication among people by recognizing emotions of communication partners. For example, PTL 1 discloses an emotion estimation device that estimate emotion of a conversational partner.

CITATION LIST

Patent Literature

PTL 1: Japanese Unexamined Patent Application Publication No. 2018-68618

SUMMARY OF THE INVENTION

However, the emotion includes private elements, and sometimes communication goes wrong if you recognize emotions of your communication partner too much. Therefore, control over provision of emotion data to communication partners is expected.

It is desirable to provide an information processing device, communication support device, and communication support system that make it possible to achieve better communication.

An information processing device according to an embodiment of the present disclosure includes a first emotion estimation section, a second emotion estimation section, an emotion data generation section, and a communication section. The first emotion estimation section is configured to generate first emotion data by estimating emotion of a user on the basis of a result of detection made by a first sensing section configured to detect behavior of the user, the behavior being used for communication. The second emotion estimation section is configured to generate second emotion data by estimating emotion of the user on the basis of a result of detection made by a second sensing section configured to detect movement or response of the user, the movement or response not being used for communication. The emotion data generation section is configured to decide a combination ratio between the first emotion data and the second emotion data, and to generate third emotion data by combining the first emotion data and the second emotion data with use of the decided combination ratio. The communication section is configured to transmit the third emotion data.

A communication support device according to an embodiment of the present disclosure includes a first sensing section, a first emotion estimation section, a second sensing section, a second emotion estimation section, an emotion data generation section, and a communication section. The first sensing section is configured to detect behavior of a user, the behavior being used for communication. The first emotion estimation section is configured to generate first emotion data by estimating emotion of a user on the basis of a result of detection made by the first sensing section. The second sensing section is configured to detect movement or response of the user, the movement or response not being used for communication. The second emotion estimation section is configured to generate second emotion data by estimating emotion of the user on the basis of a result of detection made by the second sensing section. The emotion data generation section is configured to decide a combination ratio between the first emotion data and the second emotion data, and to generate third emotion data by combining the first emotion data and the second emotion data with use of the decided combination ratio. The communication section is configured to transmit the third emotion data.

A communication support system according to an embodiment of the present disclosure includes a first communication support device and a second communication support device. The first communication support device includes a first sensing section, a first emotion estimation section, a second sensing section, a second emotion estimation section, an emotion data generation section, and a first communication section. The first sensing section is configured to detect behavior of a user, the behavior being used for communication. The first emotion estimation section is configured to generate first emotion data by estimating emotion of a user on the basis of a result of detection made by the first sensing section. The second sensing section is configured to detect movement or response of the user, the movement or response not being used for communication. The second emotion estimation section is configured to generate second emotion data by estimating emotion of the user on the basis of a result of detection made by the second sensing section. The emotion data generation section is configured to decide a combination ratio between the first emotion data and the second emotion data, and to generate third emotion data by combining the first emotion data and the second emotion data with use of the decided combination ratio. The first communication section is configured to transmit the third emotion data to the second communication support device. The second communication support device includes a second communication section and a user interface section. The second communication section is configured to receive the third emotion data. The user interface section is configured to display the third emotion data received by the second communication section.

The information processing device, communication support device, and communication support system according to an embodiment of the present disclosure generate first emotion data by estimating emotion of a user on the basis of a result of detection made by a first sensing section, and generate second emotion data by estimating emotion of the user on the basis of a result of detection made by a second sensing section. Next, third emotion data is generated by combining the first emotion data and the second emotion data. This combination process is performed with use of a decided combination ratio between the first emotion data and the second emotion data.

BRIEF DESCRIPTION OF DRAWING

FIG. 1 is a block diagram illustrating a configuration example of a communication support device according to an embodiment of the present disclosure.

FIG. 2 is an explanatory diagram illustrating a configuration example of a communication support system that includes the communication support devices illustrated in FIG. 1

FIG. 3 is an explanatory diagram illustrating an example of a display screen of the communication support device illustrated in FIG. 1.

FIG. 4 is an explanatory diagram illustrating another example of the display screen of the communication support device illustrated in FIG. 1.

FIG. 5 is an explanatory diagram illustrating another example of the display screen of the communication support device illustrated in FIG. 1.

FIG. 6 is an explanatory diagram illustrating operation of the communication support device illustrated in FIG. 1.

FIG. 7 is a flowchart illustrating an example of operation of the communication support device illustrated in FIG. 1.

FIG. 8 is a flowchart illustrating a shared emotion data generation process performed by the communication support device illustrated in FIG. 1.

MODES FOR CARRYING OUT THE INVENTION

Next, with reference to drawings, details of embodiments of the present disclosure will be described.

EMBODIMENTS

Configuration Example

FIG. 1 illustrates a configuration example of a communication support device 1 that includes an information processing device according to an embodiment. The communication support device 1 is a device that supports communication between a user and a communication partner when being used by the user.

FIG. 2 illustrates a configuration example of a communication support system 100 to be used in a case where two user including a user UA and a user UB communicates with each other. The communication between the two users including the user UA and the user UB may be face-to-face communication or remote communication using a World Wide Web (web) conference system, for example. The communication support system 100 includes two communication support devices 1 (communication support devices 1A and 1B). The communication support device 1A is a device to be used by the user UA, and the communication support device 1B is a device to be used by the user UB. The communication support devices 1A and 1B are configured to perform communication with each other. The communication support device 1A transmits data indicating emotion of the user UA to the communication support device 1B, and the communication support device 1B transmits data indicating emotion of the user UB to the communication support device 1A. Therefore, it becomes possible for the user UA to recognize the emotion of the user UB, and it becomes possible for the user UB to recognize the emotion of the user UA. Accordingly, the communication support device 1 is configured to achieve better communication.

It is to be noted that, in this example, the communication support system 100 includes the two communication support devices 1. However, the present disclosure is not limited thereto. For example, the communication support system 100 may include three or more communication support devices 1 in a case where there are three or more users.

The communication support device 1 (FIG. 1) includes a public modal sensing section 11, a private modal sensing section 12, and an information processing device 20.

The public modal sensing section 11 is configured to detect a public modal of a user who uses the communication support device 1. The public modal includes information related to behavior of a user for communication such as facial expression, action, gesture, conversational content, vocabulary, tone of voice, intonation, volume of voice, the number of words, or the like of the user. For example, the public modal is information that may be easily recognized by a communication partner. It is possible for the user to intentionally control his/her public modal. Therefore, the public modal may reflect not only true feelings but also a public stance of the user. The public modal sensing section 11 includes an image sensor, a microphone, and the like, for example. The public modal sensing section 11 is configured to detect such a public modal and supply a result of the detection to the information processing device 20.

The private modal sensing section 12 is configured to detect a private modal of a user who uses the communication support device 1. The private modal includes information related to a life activity of the user such as heart rate, perspiration, breathing rate, brain waves, blood flow rate, hormone, or the like of the user. In addition, the private modal also includes information about a behavior of tensing muscles such as shoulder, arm, leg, or the like, a behavior of clenching a hand, a behavior of clenching teeth, a behavior of stretching a leg, and the like. The private modal is a movement or response of the user that are not used for communication, and it is difficult for the communication partner to recognize the private modal. It is difficult for the user to intentionally control his/her private modal. Therefore, the private modal may reflect true feelings of the user. The private modal sensing section 12 includes a sensor of detecting such biological information, for example. For example, it is possible to use a wearable device as the private modal sensing section 12. The private modal sensing section 12 is configured to detect such a private modal and supply a result of the detection to the information processing device 20.

The information processing device 20 is configured to generate shared emotion data DT3 on the basis of the result of detection made by the public modal sensing section 11 and the result of detection made by the private modal sensing section 12. The shared emotion data DT3 is configured to be supplied to another communication support device to be used by the communication partner of the user. The information processing device 20 may be a smartphone or a personal computer, for example. The information processing device 20 includes an external emotion estimation section 21, an internal emotion estimation section 22, a context dictionary storage section 24, a context analysis section 23, a shared emotion generation section 25, a user interface section 26, and a communication section 27. The external emotion estimation section 21, the internal emotion estimation section 22, the context analysis section 23, and the shared emotion generation section 25 may be achieved by a processor such as a central processing unit (CPU) executing application software.

The external emotion estimation section 21 is configured to generate external emotion data DT1 by estimating emotion (external emotion) of the user who uses the communication support device 1 on the basis of the result of detection made by the public modal sensing section 11. The external emotion data DT1 includes a parameter Ae indicating an arousal level and a parameter Ve indicating an emotional valence. These parameters Ae and Ve are parameters used in the Russell's circumplex model of emotion. For example, the external emotion estimation section 21 makes it possible to select data to be used for estimating external emotion from the result of detection made by the public modal sensing section 11, on the basis of an operation input from the user via the user interface section 26. The external emotion estimation section 21 is configured to supply the generated external emotion data DT1 to the shared emotion generation section 25.

The internal emotion estimation section 22 is configured to generate internal emotion data DT2 by estimating emotion (internal emotion) of the user who uses the communication support device 1 on the basis of the result of detection made by the private modal sensing section 12. The internal emotion data DT2 includes a parameter Ai indicating an arousal level and a parameter Vi indicating an emotional valence. These parameters Ai and Vi are parameters used in the Russell's circumplex model of emotion, like the above-described parameters Ae and Ve. For example, the internal emotion estimation section 22 makes it possible to select data to be used for estimating internal emotion from the result of detection made by the private modal sensing section 12, on the basis of an operation input from the user via the user interface section 26. The internal emotion estimation section 22 is configured to supply the generated internal emotion data DT2 to the shared emotion generation section 25.

The context analysis section 23 is configured to analyze context that is attribute information of communication between the user and the communication partner, on the basis of imaging data and sound data included in the result of detection made by the public modal sensing section 11. Specifically, for example, the context analysis section 23 analyzes information such as the type of communication, the number of people involved in communication, the attributes of communication partners, a relationship between the user and the communication partners, the user's impression of the communication partners, or frequency of meeting with the communication partners. The "type of communication" is selected from among a plurality of options including a company department meeting, a company section meeting, a lecture, a discussion, a class reunion, a party, and the like, for example. The "number of people involved in communication" is selected from among a plurality of options including a large group, a small group, a one-on-one conversation, and the like, for example. The "attributes of communication partners" is selected from among a plurality of options including a company president, a department manager, a user's staff, a client, a subcontractor, a more experienced person, an older person, a superior, a subordinate, a celebrity, and the like, for example. The "relationship between user and communication partners" is selected from among a plurality of options including an acquaintance, a best friend, a relative, a new person, and the like, for example. The "user's impression of communication partners" is selected from among a plurality of options including love, like, so-so, dislike, hate and the like, for example. The "frequency of meeting with communication partners" is selected from among a plurality of options including often, sometimes, rarely, first time, and the like, for example.

Next, the context analysis section 23 sets a threshold TH, an arousal offset A, and a non-arousal offset B on the basis of a result of analyzing such context. As will be described later, these three parameters are used by the shared emotion generation section 25 to generate the shared emotion data DT3 through a combination process based on the external emotion data DT1 and the internal emotion data DT2. The threshold TH is a threshold of the parameter Ae included in the external emotion data DT1, and is a parameter to be used for determining which of two methods of generating the shared emotion data DT3 to use. The arousal offset A and the non-arousal offset B are parameters for adjusting a combination ratio to be used for performing the combination process based on the external emotion data DT1 and the internal emotion data DT2.

The context analysis section 23 continuously performs such a process while the user is communicating with someone. Next, the context analysis section 23 supplies the set threshold TH, the set arousal offset A, and the set non-arousal offset B to the shared emotion generation section 25.

The context dictionary storage section 24 is configured to store various kinds of data to be used by the context analysis section 23 for analyzing context. For example, the context dictionary storage section 24 stores data related to the plurality of options, such as the type of communication, the number of people involved in communication, the attribute of communication partner, the relationship between the user and the communication partner, the user's impression of the communication partner, or the frequency of meeting with the communication partner. The context analysis section 23 analyzes context on the basis of the data stored in the context dictionary storage section 24. In addition, the context dictionary storage section 24 also stores results of analysis made by the context analysis section 23 and data input from the user operating the user interface section 26.

The shared emotion generation section 25 is configured to generate the shared emotion data DT3 by performing the combination process with use of the threshold TH, the arousal offset A, and the non-arousal offset B, on the basis of the external emotion data DT1 and the internal emotion data DT2. In addition, in a case where an internal emotion disclosure level P is supplied from the user interface section 26, the shared emotion generation section 25 makes it possible to generate the shared emotion data DT3 by performing the combination process with use of the internal emotion disclosure level P on the basis of the external emotion data DT1 and the internal emotion data DT2. The shared emotion data DT3 is data indicating emotion that should be disclosed to and shared with the communication partner of the user. The shared emotion data DT3 includes a parameter As indicating an arousal level and a parameter Vs indicating an emotional valence. These parameters As and Vs are parameters used in the Russell's circumplex model of emotion, like the above-described parameters Ae, Ve, Ai, and Vi. The shared emotion generation section 25 supplies the generated shared emotion data DT3 to the user interface section 26 and the communication section 27.

In addition, the shared emotion generation section 25 also has a function of monitoring the generated shared emotion data DT3. In addition, for example, the user interface section 26 changes a display mode for displaying the shared emotion data DT3 in a case where the shared emotion data DT3 is drastically changed in a short time.

The user interface section 26 is configured to provide the user with information and to accept an operation input from the user. The user interface section 26 includes a display panel, a touch panel, various kinds of buttons, a speaker, and the like, for example. For example, the user interface section 26 displays the shared emotion data DT3 generated by the shared emotion generation section 25, and shared emotion data DT4 related to the communication partner. The shared emotion data DT4 is received by the communication section 27. In addition, for example, the user interface section 26 accepts an operation input of the internal emotion disclosure level P from the user. The internal emotion disclosure level P indicates how much internal emotion to disclose.

FIG. 3 illustrates an example of a display screen displayed by the user interface section 26. A display screen D1 displays the Russell's circumplex model of emotion. Its vertical axis represents the arousal level, and its horizontal axis represents the emotional valence. The display screen D1 displays two symbols SDT3 and SDT4. The symbol SDT3 corresponds to the shared emotion data DT3 related to the user, and is disposed at a position indicated by the parameters As and Vs included in the shared emotion data DT3. The symbol SDT4 corresponds to the shared emotion data DT4 related to the communication partner, and is disposed at a position indicated by the parameters As and Vs included in the shared emotion data DT4. By seeing such a display screen D1, the user of the communication support device 1 makes it possible to check emotion of the communication partner and his/her own emotion disclosed to the communication partner.

FIG. 4 illustrates another example of the display screen displayed by the user interface section 26. A display screen D2 displays two more symbols SDT1 and SDT2. The symbol SDT1 corresponds to the external emotion data DT1 related to the user, and is disposed at a position indicated by the parameters Ae and Ve included in the external emotion data DT1. The symbol SDT2 corresponds to the internal emotion data DT2 related to the user, and is disposed at a position indicated by the parameters Ai and Vi included in the internal emotion data DT2.

FIG. 5 illustrates another example of the display screen displayed by the user interface section 26. The display screen D3 displays two symbols SDT3 and SDT4. In this example, the symbol SDT3 is displayed in a blinking way. In other words, in this example, the shared emotion generation section 25 changes the display mode of the shared emotion data DT3 because the shared emotion data DT3 is drastically changed in a short time. In this example, the symbol SDT3 is blinking. However, the present disclosure is not limited thereto. Instead, it is also possible to change the size or color of the symbol SDT3, or display a window or a pop-up icon, for example. In addition, in this example, the display mode is changed. However, the present disclosure is not limited thereto. It is also possible to beep a sound or vibrate the information processing device 20.

In addition, the display screen D3 displays a slider SL that accepts an operation input of the internal emotion disclosure level P from the user. It is possible for the user to adjust the internal emotion disclosure level P by operating the slider SL. For example, it is possible for the user to adjust the internal emotion disclosure level P by operating the slider SL in a case where the shared emotion data DT3 is drastically changed in a short time but the user does not want the communication partner to notice the change in the emotion. This makes it possible to modify a rate of change in the shared emotion data DT3, for example.

The communication section (FIG. 1) is configured to exchange data with another communication support device to be used by the communication partner of the user. The communication section 27 may perform wired or wireless communication. In addition, the communication section 27 may perform communication the other communication support device directly or via one or more relay devices. The communication section 27 transmits the shared emotion data DT3 generated by the shared emotion generation section 25 and receives the shared emotion data DT4 related to the communication partner, by performing communication with the other communication support device used by the communication partner of the user. Next, the communication section 27 supplies the received shared emotion data DT4 to the user interface section 26.

Such a configuration allows the communication support device 1A to transmit the shared emotion data DT3 related to the user UA to the communication support device 1B and receive the shared emotion data DT4 related to the user UB transmitted from the communication support device 1B in the communication support system 100 (FIG. 2), for example. The same applies to the communication support device 1B. Therefore, it becomes possible for the user UA to recognize the emotion of the user UB, and it becomes possible for the user UB to recognize the emotion of the user UA.

In particular, the communication support system 100 shares the emotion with the communication partner with use of the shared emotion data DT3 and DT4. This allows the communication support system 100 to achieve better communication.

In other words, as illustrated in FIG. 6, the external emotion is emotion that the communication partner may easily recognize. However, it is possible for people to intentionally control their external emotion. Therefore, sometimes the external emotion does not reflect their true feelings. Meanwhile, the internal emotion is emotion that the communication partner may not easily recognize. It is difficult for people to intentionally control their internal emotion. Therefore, the internal emotion reflects their true feelings and is near their true emotion. Accordingly, sometimes people want to hide their internal emotion from the communication partners.

In general, it is possible to improve communication among people by recognizing emotions of communication partners. In particular, it is important to recognize the emotions of communication partners in a case where people in physically separate locations communicate with each other, or in a case where unfamiliar people communicate with each other. However, there is a possibility that communication goes wrong if you recognize emotions of your communication partner too much. Also, sometimes people do not want to disclose their true emotions in view of their privacy.

Therefore, the communication support device 1 generates the shared emotion data DT3 indicating emotion that should be disclosed to and shared with the communication partner, by performing the combination process on the basis of the external emotion data DT1 indicating external emotion and the internal emotion data DT2 indicating internal emotion. This allows the communication support device 1 to control the shared emotion to be disclosed to the communication partner, and achieve better communication, for example.

Here, the public modal sensing section 11 corresponds to a specific example of "first sensing section" according to the present disclosure. The external emotion estimation section 21 corresponds to a specific example of "first emotion estimation section" according to the present disclosure. The external emotion data DT1 corresponds to a specific example of "first emotion data" according to the present disclosure. The private modal sensing section 12 corresponds to a specific example of "second sensing section" according to the present disclosure. The internal emotion estimation section 22 corresponds to a specific example of "second emotion estimation section" according to the present disclosure. The internal emotion data DT2 corresponds to a specific example of "second emotion data" according to the present disclosure. The shared emotion generation section 25 corresponds to a specific example of "emotion data generation section" according to the present disclosure. The shared emotion data DT3 corresponds to a specific example of "third emotion data" according to the present disclosure. The context analysis section 23 corresponds to a specific example of "analysis section" according to the present disclosure. The communication section 27 corresponds to a specific example of "communication section" according to the present disclosure. The user interface section 26 corresponds to a specific example of "user interface section" according to the present disclosure. The shared emotion data DT4 corresponds to a specific example of "fourth emotion data" according to the present disclosure.

[Operations and Actions]

Next, operations and actions of the communication support device 1 according to the present embodiment will be described.

(Overview of Overall Operation)

First, with reference to FIG. 1, an overview of overall operation of the communication support device 1 will be described. The public modal sensing section 11 detects a public modal of a user who uses the communication support device 1. The private modal sensing section 12 detects a private modal of the user who uses the communication support device 1. The external emotion estimation section 21 of the information processing device 20 generates external emotion data DT1 by estimating external emotion of the user who uses the communication support device 1 on the basis of a result of detection made by the public modal sensing section 11. The internal emotion estimation section 22 generates internal emotion data DT2 by estimating internal emotion of the user who uses the communication support device 1 on the basis of a result of detection made by the private modal sensing section 12. The context analysis section 23 analyzes context that is attribute information of communication between the user and a communication partner, on the basis of imaging data and sound data included in the result of detection made by the public modal sensing section 11. Next, the context analysis section 23 sets a threshold TH, an arousal offset A, and a non-arousal offset B on the basis of a result of analyzing the context. The context dictionary storage section 24 stores various kinds of data to be used by the context analysis section 23 for analyzing context. The shared emotion generation section 25 generates the shared emotion data DT3 by performing the combination process with use of the threshold TH, the arousal offset A, and the non-arousal offset B, on the basis of the external emotion data DT1 and the internal emotion data DT2. In addition, in a case where an internal emotion disclosure level P is supplied from the user interface section 26, the shared emotion generation section 25 generates the shared emotion data DT3 by performing the combination process with use of the internal emotion disclosure level P on the basis of the external emotion data DT1 and the internal emotion data DT2. For example, the user interface section 26 displays the shared emotion data DT3 generated by the shared emotion generation section 25, and shared emotion data DT4 related to the communication partner. The shared emotion data DT4 is received by the communication section 27. In addition, for example, the user interface section 26 accepts an operation input of the internal emotion disclosure level P from the user. The internal emotion disclosure level P indicates how much internal emotion to disclose. The communication section 27 transmits the shared emotion data DT3 generated by the shared emotion generation section 25 and receives the shared emotion data DT4 related to the communication partner, by performing communication with another communication support device used by the communication partner of the user.

(Detailed Operation)

FIG. 7 illustrates an example of operation of the communication support device 1. For example, the communication support device 1 starts the following operation when the user operates a communication start button via application software installed in the information processing device 20.

First, the context analysis section 23 sets a threshold TH, an arousal offset A, and a non-arousal offset B (Step S101). Specifically, the context analysis section 23 analyzes context that is attribute information of communication between users, on the basis of imaging data and sound data included in a result of detection made by the public modal sensing section 11. Next, next, the context analysis section 23 sets the threshold TH, the arousal offset A, and the non-arousal offset B on the basis of the result of analyzing the context.

Next, the external emotion estimation section 21 generates external emotion data DT1 by estimating external emotion of the user on the basis of the result of detection made by the public modal sensing section 11, and the internal emotion estimation section 22 generates internal emotion data DT2 by estimating internal emotion of the user on the basis of the result of detection made by the private modal sensing section 12 (Step S102). For example, the external emotion estimation section 21 makes it possible to select data to be used for estimating the external emotion from the result of detection made by the public modal sensing section 11, on the basis of an operation input from the user via the user interface section 26. In a similar way, for example, the internal emotion estimation section 22 makes it possible to select data to be used for estimating the internal emotion from the result of detection made by the private modal sensing section 12, on the basis of an operation input from the user via the user interface section 26.

Next, the shared emotion generation section 25 generates the shared emotion data DT3 on the basis of the external emotion data DT1 and the internal emotion data DT2 (Step S103). Specifically, the shared emotion generation section 25 generates the shared emotion data DT3 by performing the combination process with use of the threshold TH, the arousal offset A, and the non-arousal offset B, on the basis of the external emotion data DT1 and the internal emotion data DT2. In addition, in a case where the internal emotion disclosure level P is supplied from the user interface section 26, the shared emotion generation section 25 generates the shared emotion data DT3 by performing the combination process with use of the internal emotion disclosure level P on the basis of the external emotion data DT1 and the internal emotion data DT2.

FIG. 8 illustrates an example of a process of generating the shared emotion data DT3.

First, the shared emotion generation section 25 checks whether the internal emotion disclosure level P is supplied from the user interface section 26 (Step S111). In a case where the internal emotion disclosure level P is supplied ("Y" in Step S111), the shared emotion generation section 25 calculates parameters Vs and As of the shared emotion data DT3 with use of the following mathematical expression on the basis of the internal emotion disclosure level P, parameters Ve and Ae included in the external emotion data DT1, and parameters Vi and Ai included in the internal emotion data DT2 (Step S112).

$$Vs=(1-P)\times Ve+P\times Vi$$

$$As=(1-P)\times Ae+P\times Ai$$

The internal emotion disclosure level P is a value that is 0 or more and 1 or less. As the internal emotion disclosure level P gets higher, contribution of the parameters Vi and Ai included in the internal emotion data DT2 to the parameters Vs and As gets larger. As the internal emotion disclosure level P gets lower, contribution of the parameters Ve and Ae included in the external emotion data DT1 to the parameters Vs and As gets larger. Then, the process of generating the shared emotion data DT3 ends.

The shared emotion generation section 25 checks whether the parameter Ae included in the external emotion data DT1 is larger than the threshold TH (Ae>TH) (Step S123) in a case where the internal emotion disclosure level P is not supplied from the user interface section 26 in Step S111 ("N" in Step S111).

The shared emotion generation section 25 calculates a tension level T with use of the following mathematical expression on the basis of the parameter Ae, the arousal offset A, and a maximum value Aemax of the parameter Ae (Step S114), in a case where the parameter Ae is larger than the threshold TH ("Y" in Step S113).

$$T=(Ae+A)/Ae\text{max}$$

For example, the tension level T gets higher as the parameter Ae or the arousal offset A gets larger.

Next, the shared emotion generation section 25 calculates parameters Vs and As of the shared emotion data DT3 with use of the following mathematical expression on the basis of the tension level T, the parameters Ve and Ae included in the external emotion data DT1, and the parameters Vi and Ai included in the internal emotion data DT2 (Step S115).

$$Vs=T\times Ve+(1-T)\times Vi$$

$$As=T\times Ae+(1-T)\times Ai$$

As the tension level T gets higher, contribution of the parameters Ve and Ae included in the external emotion data DT1 to the parameters Vs and As gets larger. As the tension level T gets lower, contribution of the parameters Vi and Ai included in the internal emotion data DT2 to the parameters Vs and As gets larger.

As described above, communication with a tense feeling such as a company meeting is assumed in a case where the parameter Ae is larger than the threshold TH ("Y" in Step S113). Therefore, the shared emotion generation section 25 generates the shared emotion data DT3 with use of the mathematical expression in Step S115 on the basis of the tension level T. Then, the process of generating the shared emotion data DT3 ends.

The shared emotion generation section 25 calculates a relaxation level R with use of the following mathematical expression on the basis of the parameter Ae, the non-arousal offset B, and a minimum value Aemin of the parameter Ae (Step S116), in a case where the parameter Ae is not larger than the threshold TH ("Y" in Step S113).

$$R=|Ae+B|/|Ae\text{min}|$$

For example, the relaxation level R gets higher as the parameter Ae or the non-arousal offset B gets smaller.

Next, the shared emotion generation section 25 calculates parameters Vs and As of the shared emotion data DT3 with use of the following mathematical expression on the basis of the relaxation level R, the parameters Ve and Ae included in the external emotion data DT1, and the parameters Vi and Ai included in the internal emotion data DT2 (Step S117).

$$Vs=(1-R)\times Ve+R\times Vi$$

$$As=(1-R)\times Ae+R\times Ai$$

As the relaxation level R gets higher, the contribution of the parameters Vi and Ai included in the internal emotion data DT2 to the parameters Vs and As gets larger. As the relaxation level R gets lower, the contribution of the parameters Ve and Ae included in the external emotion data DT1 to the parameters Vs and As gets larger.

As described above, communication with a relaxed feeling such as communication with friends is assumed in a case where the parameter Ae is not larger than the threshold TH ("N" in Step S113). Therefore, the shared emotion generation section 25 generates the shared emotion data DT3 with use of the mathematical expression in Step S117 on the basis of the relaxation level R. Then, the process of generating the shared emotion data DT3 ends.

Next, with reference to FIG. 7, the user interface section 26 displays the shared emotion data DT3 as illustrated in FIG. 3 to FIG. 5 (Step S104). As illustrated in FIG. 4, the user interface section 26 may also display the external emotion data DT1 and the internal emotion data DT2 in addition to the shared emotion data DT3.

The shared emotion generation section 25 monitors the generated shared emotion data DT3. For example, the user interface section 26 changes a display mode for displaying the shared emotion data DT3 in a case where the shared emotion data DT3 is drastically changed in a short time. For example, as illustrated in FIG. 4, the user interface section 26 displays the symbol SDT3 corresponding to the shared emotion data DT3 in a blinking way on the basis of an instruction from the shared emotion generation section 25. For example, it is possible for the user to adjust the internal emotion disclosure level P by operating the slider SL in a case where the shared emotion data DT3 is drastically changed in a short time but the user does not want the communication partner to notice the change in the emotion. This makes it possible to modify the rate of change in the shared emotion data DT3, for example. In addition, by operating the user interface section 26, the user may change data to be used for estimating the external emotion among the results of detection made by the public modal sensing section 11 or data to be used for estimating the internal emotion among the results of detection made by the private modal sensing section 12. Also in this case, it is possible to modify the rate of change in the shared emotion data DT3, for example.

Next, the communication section 27 transmits the shared emotion data DT3 related to the user and receives the shared emotion data DT4 related to the communication partner of the user (Step S105).

Next, as illustrated in FIG. 3 to FIG. 5, the user interface section 26 displays the shared emotion data DT4 received by the communication section 27 (Step S106).

Next, the information processing device 20 checks whether the communication has ended (Step S107). Specifically, for example, the information processing device 20 makes it possible to check whether the communication has ended by checking whether the user has operated a communication end button via the application software. Alternatively, the information processing device 20 makes it possible to check whether the communication has ended on the basis of a result of analysis made by the context analysis section 23, for example.

In a case where the communication has not ended ("N" in Step S107), the context analysis section 23 updates the threshold TH, the arousal offset A, and the non-arousal offset B (Step S108).

For example, the context analysis section 23 analyzes atmosphere of communication and updates the threshold TH, the arousal offset A, and the non-arousal offset B on the basis of a result of the analysis.

Specifically, for example, the context analysis section 23 increases the arousal offset A or the threshold TH to increase the ratio of the external emotion included in the shared emotion in a case where a stark atmosphere without laughing or an atmosphere with fake smile is detected. This allows the internal emotion to become less likely to be disclosed. For example, the context analysis section 23 increases the absolute value of the non-arousal offset B and decreases the threshold TH to increase the ratio of the internal emotion included in the shared emotion in a case where a casual atmosphere with jokes is detected.

In addition, for example, the context analysis section 23 analyzes change in relationship between the user and the communication partner and updates the threshold TH, the arousal offset A, and the non-arousal offset B on the basis of a result of the analysis. Specifically, the context analysis section 23 increases the ratio of the internal emotion included in the shared emotion in a case where a state where the emotional valence indicates "pleasant" has continued longer than a predetermined period of time and the impression to the communication partner indicates "like" is detected. Alternatively, the context analysis section 23 decreases the ratio of the internal emotion included in the shared emotion in a case where a state where the emotional valence indicates "unpleasant" has continued longer than a predetermined period of time and the impression to the communication partner indicates "dislike" is detected.

In such a way, the context dictionary storage section 24 updates the threshold TH, the arousal offset A, and the non-arousal offset B and stores the result of analysis. Subsequently, the context analysis section 23 makes an analysis with use of the result of analysis. Next, the process returns to Step S101, and the processes in Step S101 to Step S107 are repeated until the communication ends.

The process ends in a case where the communication ends in Step S107 ("N" in Step S107).

Next, details of the communication support device 1 will be described with reference to a plurality of usage examples.

Usage Example E1

For example, the communication support device 1 may be used in company meetings. The meeting may be a department meeting, a section meeting, a team meeting, or the like, for example. The meeting may be a face-to-face meeting or a remote meeting using a web conference system, for example. The number of participants in such a meeting may be a small group such as two or three employees or a large group such as ten or more employees. The employees each use the communication support device 1. For example, the communication support device 1 used by an employee displays shared emotions of the plurality of employees on its screen illustrated in FIG. 3 to FIG. 5.

For example, it is possible for a host of the meeting to recognize whether the participants are trying to concentrate on the meeting on the basis of the respective arousal levels of the participants (vertical axis in FIG. 3 to FIG. 5). In addition, it is possible for the host of the meeting to recognize whether the participants are having a positive impression or a negative impression with regard to content of discussion on the basis of the respective emotional valences of the participants (horizontal axis in FIG. 3 to FIG. 5). This makes it possible to offer well-balanced opportunities to express their views to participants having varying opinions on various issues.

Meanwhile, for example, it is possible for a speaker of the meeting to recognize participants' levels of interest in a speech from the speaker on the basis of the respective arousal levels of the participants. In addition, for example, it is possible for the speaker of the meeting to recognize responses to the speech from the speaker on the basis of the respective emotional valences of the participants.

In addition, for example, it is possible for a participant in the meeting to notice his/her true feeling about a speech from another person by checking a shared emotion of himself/herself displayed on the user interface section 26. This allows the participant to control his/her way to express feelings from his/her position by adjusting his/her own facial expression, action, tone of voice.

The communication support device 1 generates the shared emotion data DT3 indicating the shared emotion, by performing the combination process on the basis of the external emotion data DT1 indicating external emotion and the internal emotion data DT2 indicating internal emotion. This prevents the host, speaker, and the participants in the meeting from disclosing too much internal emotion. Therefore, it becomes possible to achieve better communication. In addition, for example, as the discussion progresses, the participants tend to express their true opinions in a case where the atmosphere of communication has shifted to a more casual atmosphere or the like. In this case, the communication support device 1 makes it possible to increase the ratio of the internal emotion included in the shared emotion. Therefore, for example, the speaker of the meeting becomes easier to recognize true emotions of the participants, and it becomes possible to achieve better communication.

Usage Example E2

For example, the communication support device 1 may be used in lectures at schools such as junior high schools, high schools, colleges, universities, or the like. The lecture may be a face-to-face lecture or a remote lecture using a web conference system, for example. For example, the number of participants in such a lecture may be a large group such as 30 or more students. The students and teachers each use the communication support device 1. For example, the communication support device 1 used by a teacher collectively displays shared emotions of the plurality of students on its screen illustrated in FIG. 3 to FIG. 5. Meanwhile, for example, the communication support device 1 used by a student displays shared emotion of himself/herself and shared emotion of the other students on its screen illustrated in FIG. 3 to FIG. 5.

For example, it is possible for the teacher to recognize whether the students are trying to concentrate on the lecture on the basis of the respective arousal levels of the students (vertical axis in FIG. 3 to FIG. 5). In particular, in a case of the remote lecture, it is difficult to check camera images of all the students to check whether the students are concentrating on the lecture. However, by using the communication support device 1, it becomes possible to check situations of all the students at a glance. In addition, it is also possible for the teacher to recognize whether the students are interested in content of the lecture on the basis of the respective emotional valences of the students (horizontal axis in FIG. 3 to FIG. 5). Therefore, for example, it becomes possible for the teacher to modify the lecture in such a manner that more students may become interested in the lecture.

Meanwhile, for example, it is possible for the student to check the shared emotion of himself/herself displayed on the user interface section 26 and behave in such a manner that the shared emotion indicates that he/she is concentrating on the lecture. In addition, for example, it is possible for the student to find another student who are interested in a same thing as himself/herself on the basis of the emotional valences of the other students (horizontal axis in FIG. 3 to FIG. 5). This may trigger communication between students.

Usage Example E3

For example, the communication support device 1 may be used in so-called pair programming in which a programming beginner learns programming while developing a program. The pair programming may be performed face-to-face or remotely using a web conference system, for example. Pair programming involves learners with similar programming skills who play the role of teacher and student, and an observer who supervises the work. The learner playing the role of teacher, the learner playing the role of student, and the observer each use the communication support device 1. For example, the communication support device 1 used by each of the two learners displays shared emotions of the two learners on its screen illustrated in FIG. 3 to FIG. 5. In addition, for example, the communication support device 1 used by the observer displays the shared emotions of the two learners on its screen illustrated in FIG. 3 to FIG. 5.

For example, it is possible for the learner playing the role of teacher to recognize whether the learner playing the role of student is concentrating on his/her work on the basis of the arousal level of the learner playing the role of student (vertical axis in FIG. 3 to FIG. 5). In addition, it is possible for the learner playing the role of teacher to recognize whether the learner playing the role of student has taken his/her advice positively or negatively, on the basis of the emotional valence of the learner playing the role of student (horizontal axis in FIG. 3 to FIG. 5).

Meanwhile, for example, it is possible for the learner playing the role of student to recognize whether the learner playing the role of teacher has given his/her advice with concentration after careful thought, on the basis of the arousal level of the learner playing the role of teacher (vertical axis in FIG. 3 to FIG. 5). For example, the learner playing the role of student is more likely to accept advice in a case where the learner playing the role of teacher has given his/her advice after careful thought. In addition, it is possible for the learner playing the role of student to check the shared emotion of himself/herself displayed on the user interface section 26 and behave in such a manner that the shared emotion indicates that he/she has taken the advice with sincerity or in such a manner that the shared emotion indicates that he/she is not satisfied with the advice.

In addition, for example, it is possible for the observer to check the shared emotions of the learner playing the role of teacher and the learner playing the role of student displayed on the user interface section 26 and check whether they have progressed their work while communicating with each other appropriately. For example, it is possible for the observer to let them continue the work as is in a case where they have progressed the work while communicating with each other appropriately. Alternatively, for example, if the communication between the learners has gone wrong, it is possible to take some measures such as exchanging their roles or pairing with another person. This makes it possible to improve learning efficiency.

Usage Example E4

For example, the communication support device 1 may be used in consultation. In this example, it is assumed that a married couple has a consultation, for example. The consultation may be held face-to-face or remotely using a web conference system, for example. A consultant, a husband, and a wife each use the communication support device 1. For example, the communication support device 1 used by the consultant displays respective shared emotions of the husband and wife on its screen illustrated in FIG. 3 to FIG. 5. In addition, for example, the respective communication support devices 1 used by the husband and wife display the respective shared emotions of the husband and wife on its screen illustrated in FIG. 3 to FIG. 5. For example, the communication support device 1 used by the husband generates shared emotion data DT3 related to the shared emotion to be disclosed to the consultant, shared emotion data DT3 related to the shared emotion to be disclosed to the wife, and shared emotion data DT3 related to the shared emotion to be displayed on his own device. For example, the shared emotion to be disclosed to the consultant includes external emotion at a high rate, and the shared emotion to be disclosed to the wife includes internal emotion at a high rate. The same applies to the wife.

For example, it is possible for the consultant to recognize which of explained contents the married couple is interested in on the basis of the respective emotional valences of the husband and wife (horizontal axis in FIG. 3 to FIG. 5). Therefore, this makes it possible to conduct the consultation efficiently.

Meanwhile, for example, the husband discloses his shared emotion including internal emotion at a high rate to the wife, and the wife discloses his shared emotion including internal emotion at a high rate to the husband. Therefore, it is possible for the married couple to share their attitude to the explanation from the consultant with each other by checking the shared emotions of the husband and wife displayed on the user interface sections 26.

Usage Example E5

For example, the communication support device 1 may be used in an online game in which a plurality of players cooperates with each other. For example, it is assumed that the game is played with unfamiliar people. The players each use the communication support device 1. For example, the communication support device 1 used by a player displays shared emotions of the plurality of players on its screen illustrated in FIG. 3 to FIG. 5.

For example, it is possible for the player to recognize whether the other players have accepted his/her play style, on the basis of the emotional valences of the other players (horizontal axis in FIG. 3 to FIG. 5). For example, when just starting the game, the player communicates with the other players while hiding his/her true feeling by reducing the ratio of the internal emotion included in the shared emotion. Next, as time advances, the players disclose their true feelings to each other by gradually increasing the ratio of the internal emotion included in the shared emotion. This makes it possible to achieve smooth communication with each other. This makes it possible to open up to each other and then progress the communication to conversation or text chatting.

Usage Example E6

For example, the communication support device 1 may be used in parties. The party may be a face-to-face party or a remote party. Each participant in the party uses the communication support device 1. For example, the communication support device 1 used by the participant displays shared emotions of the other participants on its screen illustrated in FIG. 3 to FIG. 5.

For example, in the party, sometimes it is difficult to join a conversation even if a participant is interested in the topic of the conversation. In this case, for example, the shared emotion of the participant is disclosed to the other participants. This makes it easier for the participant to join the conversation or the participant becomes more likely to be spoken to by the other participants by informing that the participant is interested in the topic.

Alternatively, by checking the shared emotion of himself/herself displayed on the user interface section 26, it is possible for the participant behave in such a manner that the shared emotion indicates that he/she is interested in the topic even in a case where the participant is not interested in the topic. In addition, for example, in a case where the participant feels uncomfortable about the topic, it is possible for the participant to behave amicably in such a manner that the uncomfortable feeling does not reach his/her communication partner.

In addition, for example, in a case of a party for searching for boyfriends or girlfriends, it is possible to disclose shared emotion including internal emotion at a low rate to the opposite sex, but disclose shared emotion including internal emotion at a high rate to the same sex. This makes it possible to hide their true feelings from the opposite sex, but inform the same sex about who is your favorite.

Usage Example E7

For example, the communication support device 1 may be used in livestreaming. In the livestreaming, viewers may gather in a venue for the livestreaming or may watch livestreaming online. The viewers and operating company of the livestreaming each use the communication support device 1. For example, the communication support device 1 used by the operating company displays shared emotions of the viewers of the livestreaming on its screen illustrated in FIG. 3 to FIG. 5. The communication support devices 1 used by the viewers of the livestreaming display the shared emotions of the viewers of the livestreaming on its screen illustrated in FIG. 3 to FIG. 5.

For example, it is possible for staffs in the operating company to recognize responses from the viewers of the livestreaming on the basis of the shared emotions of the viewers of the livestreaming displayed on the user interface section 26. In addition, for example, it is possible for the staffs in the operating company to run the event while respecting feelings of the viewers such as prolonging the live performance in a case where the viewers have good responses.

For example, it is possible for the viewers of the livestreaming to disclose their shared emotion including internal emotion at a high rate in a case where their favorite group or member is giving performances. This allows the viewers of the livestreaming to convey their emotions to the operating company. The viewers of the livestreaming may disclose their shared emotion including internal emotion at a high rate or shared emotion including external emotion at a high rate in a case where a group or member that the viewers are not interested in is giving performances. In addition, by checking the shared emotion of himself/herself displayed on the user interface section 26, it is possible for the viewer of the livestreaming to find something new such as noticing that the viewer actually likes a group that the viewer thought that he/she was not interested in.

Usage Example E8

For example, the communication support device 1 may be used in so-called online family gatherings in which a family member who lives in city has an online conversation with family members in his/her home town. The family members each use the communication support device 1. For example, the communication support devices 1 used by the family members display shared emotions of the family members on its screen illustrated in FIG. 3 to FIG. 5.

For example, it is possible for a grandfather and a grandmother of the family in the home town to easily recognize whether their grandchild living in city is enjoying or bored, on the basis of shared emotion of the grandchild displayed on the user interface section 26. In other words, by using the communication support device 1, it becomes possible to check the feelings of the grandchild at a glance although it is difficult to recognize the feelings of the grandchild by just observing a camera image. In addition, it is also possible for the grandfather and the grandmother to determine whether to change the subject of conversation or finish the conversation in a case where the grandchild is bored.

For example, it is possible for the grandchild to disclose his/her shared emotion to the grandfather and the grandmother. Therefore, for example, in a case where the grandchild is feeling happy, it is possible for the grandchild to convey his/her happy feeling to the grandfather and the grandmother by disclosing his/her shared emotion including internal emotion at a high rate. In addition, for example, in a case where the grandchild feels uncomfortable about repetition of a same topic, it is possible for the grandchild to continue the conversation while being attentive by disclosing his/her shared emotion including external emotion at a high rate. In addition, for example, it is possible for the grandchild to gradually convey the uncomfortable feeling by gradually increasing the ratio of the internal emotion included in the shared emotion.

Usage Example E9

For example, the communication support device 1 may be used in medical examinations by doctors. The medical examination may be conducted face-to-face party or remotely. The doctor and a patient each use the communication support device 1. In addition, for example, the doctor and a patient each display the respective shared emotions of the doctor and a patient on its screen illustrated in FIG. 3 to FIG. 5.

For example, it is possible for the doctor to recognize whether the patient is trying to concentrate on listening a result of the medical examination, on the basis of the arousal level of the patient (vertical axis in FIG. 3 to FIG. 5). In addition, it is also possible for the doctor to recognize whether the patient is satisfied with the explanation and whether additional explanation is necessary, on the basis of the emotional valence of the patient (horizontal axis in FIG. 3 to FIG. 5).

As described above, the communication support device 1 includes: the external emotion estimation section 21 configured to generate external emotion data DT1 by estimating emotion of a user on the basis of a result of detection made by a public modal sensing section 11 configured to detect behavior of the user, the behavior being used for communication; the internal emotion estimation section 22 configured to generate internal emotion data DT2 by estimating emotion of the user on the basis of a result of detection made by a private modal sensing section 12 configured to detect movement or response of the user, the movement or response not being used for communication; and the shared emotion generation section 25 configured to decide a combination ratio between the external emotion data DT1 and the internal emotion data DT2, and to generate shared emotion data DT3 by combining the external emotion data DT1 and the internal emotion data DT2 with use of the decided combination ratio. This allows the communication support device 1 to control the shared emotion to be disclosed to a communication partner. Therefore, it is possible to appropriately share the shared emotion in consideration of privacy of the user, and it is possible to achieve better communication.

In addition, the communication support device 1 includes the shared emotion generation section 25 configured to decide the combination ratio on the basis of the external emotion data DT1. Therefore, for example, it is possible to reduce burden on the user in comparison with a case where the user sets the combination ratio.

In addition, the communication support device 1 includes the user interface section 26 configured to display the shared emotion data DT3 related to the user and the shared emotion data DT4 related to the communication partner. This makes it easier for the user to recognize the emotion of the communication partner, and it is possible to achieve better communication.

In addition, the communication support device 1 includes: the shared emotion generation section 25 configured to monitor change in emotion indicated by the shared emotion data DT3 related to the user; and the user interface section 26 configured to change a display mode for displaying the shared emotion data DT3 on the basis of a result of monitoring done by the shared emotion generation section 25. This allows the user to determine whether to disclose his/her own shared emotion without any change or to modify his/her own shared emotion. This makes it possible to disclose an appropriate shared emotion, for example. Therefore, it becomes possible to achieve better communication.

In addition, the communication support device 1 includes: the context analysis section 23 configured to analyze atmosphere of communication on the basis of a result of detection made by the public modal sensing section 11; and the shared emotion generation section 25 configured to decide the combination ratio on the basis of a result of analysis made by the context analysis section 23. This makes it possible to disclose a shared emotion depending on the atmosphere of communication, and it is possible to achieve better communication.

Effects

As described above, the communication support device according to the present embodiment includes: the external emotion estimation section configured to generate external emotion data by estimating emotion of a user on the basis of a result of detection made by a public modal sensing section configured to detect behavior of the user, the behavior being used for communication; the internal emotion estimation section configured to generate internal emotion data by estimating emotion of the user on the basis of a result of detection made by a private modal sensing section configured to detect movement or response of the user, the movement or response not being used for communication; and the shared emotion generation section configured to decide a combination ratio between the external emotion data and the internal emotion data, and to generate shared emotion data by combining the external emotion data and the internal emotion data with use of the decided combination ratio. This makes it possible to achieve better communication.

According to the present embodiment, the shared emotion generation section is configured to decide the combination ratio on the basis of the external emotion data. Therefore, for example, it is possible to reduce burden on the user in comparison with a case where the user sets the combination ratio.

According to the present embodiment, the user interface section is configured to display the shared emotion data related to the user and the shared emotion data related to the communication partner. This makes it easier for the user to recognize the emotion of the communication partner, and it is possible to achieve better communication.

According to the present embodiment, the shared emotion generation section is configured to monitor change in emotion indicated by the shared emotion data related to the user; and the user interface section is configured to change a display mode for displaying the shared emotion data on the basis of a result of monitoring done by the shared emotion generation section. This makes it possible to achieve better communication.

According to the present embodiment, the context analysis section is configured to analyze atmosphere of communication on the basis of a result of detection made by the public modal sensing section, and the shared emotion generation section is configured to decide the combination ratio on the basis of a result of analysis made by the context analysis section. This makes it possible to achieve better communication.

The present technology has been described above with reference to the embodiment and the several modifications. However, the present technology is not limited thereto, and various kinds of modifications thereof can be made.

For example, the usage examples are not limited to the above-described usage examples. The present technology is applicable to various uses.

It is to be noted that the effects described herein are only for illustrative purposes and there may be other effects.

It is to be noted that the present technology may also have the following configurations. According to the present technology having the following configurations, it is possible to achieve better communication.

(1)

An information processing device including:

a first emotion estimation section configured to generate first emotion data by estimating emotion of a user on the basis of a result of detection made by a first sensing section configured to detect behavior of the user, the behavior being used for communication;

a second emotion estimation section configured to generate second emotion data by estimating emotion of the user on the basis of a result of detection made by a second sensing section configured to detect movement or response of the user, the movement or response not being used for communication;

an emotion data generation section configured to decide a combination ratio between the first emotion data and the second emotion data, and to generate third emotion data by combining the first emotion data and the second emotion data with use of the decided combination ratio; and a communication section configured to transmit the third emotion data.

(2)

The information processing device according to (1), in which the emotion data generation section is configured to decide the combination ratio on the basis of the first emotion data.

(3)

The information processing device according to (2), in which the first emotion data includes a first component indicating an arousal level and a second component indicating an emotional valence, and the emotion data generation section is configured to decide the combination ratio on the basis of the first component in the first emotion data.

(4)

The information processing device according to any one of (1) to (3), in which the emotion data generation section further includes an analysis section configured to analyze atmosphere of communication on the basis of a result of detection made by the first sensing section, and the emotion data generation section is configured to decide the combination ratio on the basis of a result of analysis made by the analysis section.

(5)

The information processing device according to any one of (1) to (4), further including a user interface section configured to display the third emotion data.

(6)

The information processing device according to (5), in which the third emotion data includes a first component indicating an arousal level and a second component indicating an emotional valence, and the user interface section is configured to display the third emotion data by orienting the first component and the second component of the third emotion data to a first direction and a second direction on a display screen of the user interface section.

(7)

The information processing device according to (5) or (6), in which the emotion data generation section is configured to monitor change in emotion indicated by the third emotion data, and the user interface section is configured to change a display mode of the third emotion data on the basis of a result of monitoring done by the emotion data generation section.

(8)

The information processing device according to any one of (5) to (7), in which the user interface section is configured to accept an operation input of the combination ratio from the user, and the emotion data generation section is configured to generate the third emotion data by combining the first emotion data and the second emotion data with use of the combination ratio accepted by the user interface section.

(9)

The information processing device according to any one of (1) to (8), including a user interface section, in which the communication section is further configured to receive fourth emotion data transmitted from a communication partner, and the user interface section is configured to display the fourth emotion data.

(10)

A communication support device including:

a first sensing section configured to detect behavior of a user, the behavior being used for communication;

a first emotion estimation section configured to generate first emotion data by estimating emotion of the user on the basis of a result of detection made by the first sensing section;

a second sensing section configured to detect movement or response of the user, the movement or response not being used for communication;

a second emotion estimation section configured to generate second emotion data by estimating emotion of the user on the basis of a result of detection made by the second sensing section, an emotion data generation section configured to decide a combination ratio between the first emotion data and the second emotion data, and to generate third emotion data by combining the first emotion data and the second emotion data with use of the decided combination ratio; and a communication section configured to transmit the third emotion data.

(11)

A communication support system including:

a first communication support device; and a second communication support device, in which the first communication support device includes a first sensing section configured to detect behavior of a user, the behavior being used for communication, a first emotion estimation section configured to generate first emotion data by estimating emotion of the user on the basis of a result of detection made by the first sensing section, a second sensing section configured to detect movement or response of the user, the movement or response not being used for communication, a second emotion estimation section configured to generate second emotion data by estimating emotion of the user on the basis of a result of detection made by the second sensing section, an emotion data generation section configured to decide a combination ratio between the first emotion data and the second emotion data, and to generate third emotion data by combining the first emotion data and the second emotion data with use of the decided combination ratio, and a first communication section configured to transmit the third emotion data to the second communication support device, and the second communication support device includes a second communication section configured to receive the third emotion data, and a user interface section configured to display the third emotion data received by the second communication section.

The present application claims the benefit of Japanese Priority Patent Application JP2021-178913 filed with the Japan Patent Office on Nov. 1, 2021, the entire contents of which are incorporated herein by reference.

It should be understood by those skilled in the art that various modifications, combinations, sub-combinations and alternations may occur depending on design requirements and other factors insofar as they are within the scope of the appended claims or the equivalents thereof.

The invention claimed is:

1. An information processing device, comprising:

a central processing unit (CPU) configured to:

receive, from a first sensor, first information that indicates a behavior of a user, wherein the first sensor detects the first information, and the first information is usable in communication between the user and a communication partner of the user:

estimate a first emotion of the user based on the received first information;

generate first emotion data based on the estimation of the first emotion of the user;

receive, from a second sensor, second information that indicates at least one of a movement of the user or a response of the user, wherein the second sensor detects the second information, and the second information is private to the user and unusable in the communication;

estimate a second emotion of the user based on the received second information;

generate second emotion data based on the estimation of the second emotion of the user;

receive a user input that indicates a disclosure level of the second emotion;

determine, based on the received user input, a first ratio associated with the first emotion data and a first ratio associated with the second emotion data;

combine the first emotion data and the second emotion data based on the determined first ratio associated with the first emotion data and the determined first ratio associated with the second emotion data; and generate, based on the combination of the first emotion data and the second emotion data, third emotion data in which contribution of the second emotion data is as indicated by the disclosure level; and a communication device configured to transmit the third emotion data.

2. The information processing device according to claim 1, wherein the CPU is further configured to determine the first ratio associated with the first emotion data and the first ratio associated with the second emotion data based on the first emotion data.

3. The information processing device according to claim 2, wherein the first emotion data includes:

a first component indicating an arousal level of the user, and a second component indicating an emotional valence of the user, and the CPU is further configured to determine the first ratio associated with the first emotion data and the first ratio associated with the second emotion data based on the first component in the first emotion data.

4. The information processing device according to claim 1, wherein the first sensor further detects at least one of imaging data or sound data, and the CPU is further configured to:

analyze atmosphere of the communication based on the at least one of the imaging data or the sound data; and determine the first ratio associated with the first emotion data and the first ratio associated with the second emotion data based on a result of the analysis of the atmosphere.

5. The information processing device according to claim 1, further comprising a display device configured to display the third emotion data.

6. The information processing device according to claim 5, wherein the third emotion data includes:

a first component indicating an arousal level of the user, and a second component indicating an emotional valence of the user, and the display is further configured to display, on a display screen of the display device, the third emotion data based on orientation of:

the first component of the third emotion data in a first direction on the display screen, and the second component of the third emotion data in second direction on the display screen.

7. The information processing device according to claim 5, wherein the third emotion data indicates a third emotion of the user, the CPU is further configured to monitor a change in the third emotion, and the display device is further configured to change a display mode of the third emotion data based on the change in the third emotion.

8. The information processing device according to claim 5, wherein the display device is further configured to accept an operation input associated with the user, the operation input indicates:

a second ratio associated with the first emotion data, and a second ratio associated with the second emotion data, and the CPU is further configured to;

combine the first emotion data and the second emotion data based on the second ratio associated with the first emotion data and the second ratio associated with the second emotion data; and generate the third emotion data based on the combination of the first emotion data and the second emotion data.

9. The information processing device according to claim 1, further comprising a display device, wherein the communication device is further configured to receive fourth emotion data associated with the communication partner, and the display device is configured to display the fourth emotion data.

10. A communication support device, comprising:

a first sensor configured to detect first information that indicates a behavior of a user, wherein the first information is usable in communication between the user and a communication partner of the user;

a second sensor configured to detect second information that indicates at least one of a movement of the user or a response of the user, wherein the second information is private to the user and unusable in the communication;

a central processing unit (CPU) configured to;

estimate a first emotion of the user based on the first information;

generate first emotion data based on the estimation of the first emotion of the user;

estimate a second emotion of the user based on the second information;

generate second emotion data based on the estimation of the second emotion of the user;

receive a user input that indicates a disclosure level of the second emotion;

determine, based on the received user input, a ratio associated with the first emotion data and a ratio associated with the second emotion data;

combine the first emotion data and the second emotion data based on the determined ratio associated with the first emotion data and the determined ratio associated with the second emotion data; and generate, based on the combination of the first emotion data and the second emotion data, third emotion data in which contribution of the second emotion data is as indicated by the disclosure level; and a communication device configured to transmit the third emotion data.

11. A communication support system, comprising:

a first communication support device; and a second communication support device, wherein the first communication support device includes;

a first sensor configured to detect first information that indicates a behavior of a user, wherein the first information is usable in communication between the user and a communication partner of the user;

a second sensor configured to detect second information that indicates at least one of a movement of the user or a response of the user, wherein the second information is private to the user and unusable in the communication;

a central processing unit (CPU) configured to:

estimate a first emotion of the user based on the first information;

generate first emotion data based on the estimation of the first emotion of the user:

estimate a second emotion of the user based on the second information;

generate second emotion data based on the estimation of the second;

receive a user input that indicates a disclosure level of the second emotion;

determine, based on the received user input, a ratio associated with the first emotion data and a ratio associated with the second emotion data;

combine the first emotion data and the second emotion data based on the determined ratio associated with the first emotion data and the determined ratio associated with the second emotion data; and generate, based on the combination of the first emotion data and the second emotion data, third emotion data in which contribution of the second emotion data is as indicated by the disclosure level; and a first communication device configured to transmit the third emotion data to the second communication support device, and the second communication support device includes:

a second communication device configured to receive the third emotion data; and a display device configured to display the received third emotion data.

* * * * *